Feb. 21, 1950 J. H. ADLER 2,498,229
PORTABLE SERVICE STATION MOUNTED ON A VEHICLE
Filed July 9, 1948 8 Sheets-Sheet 5

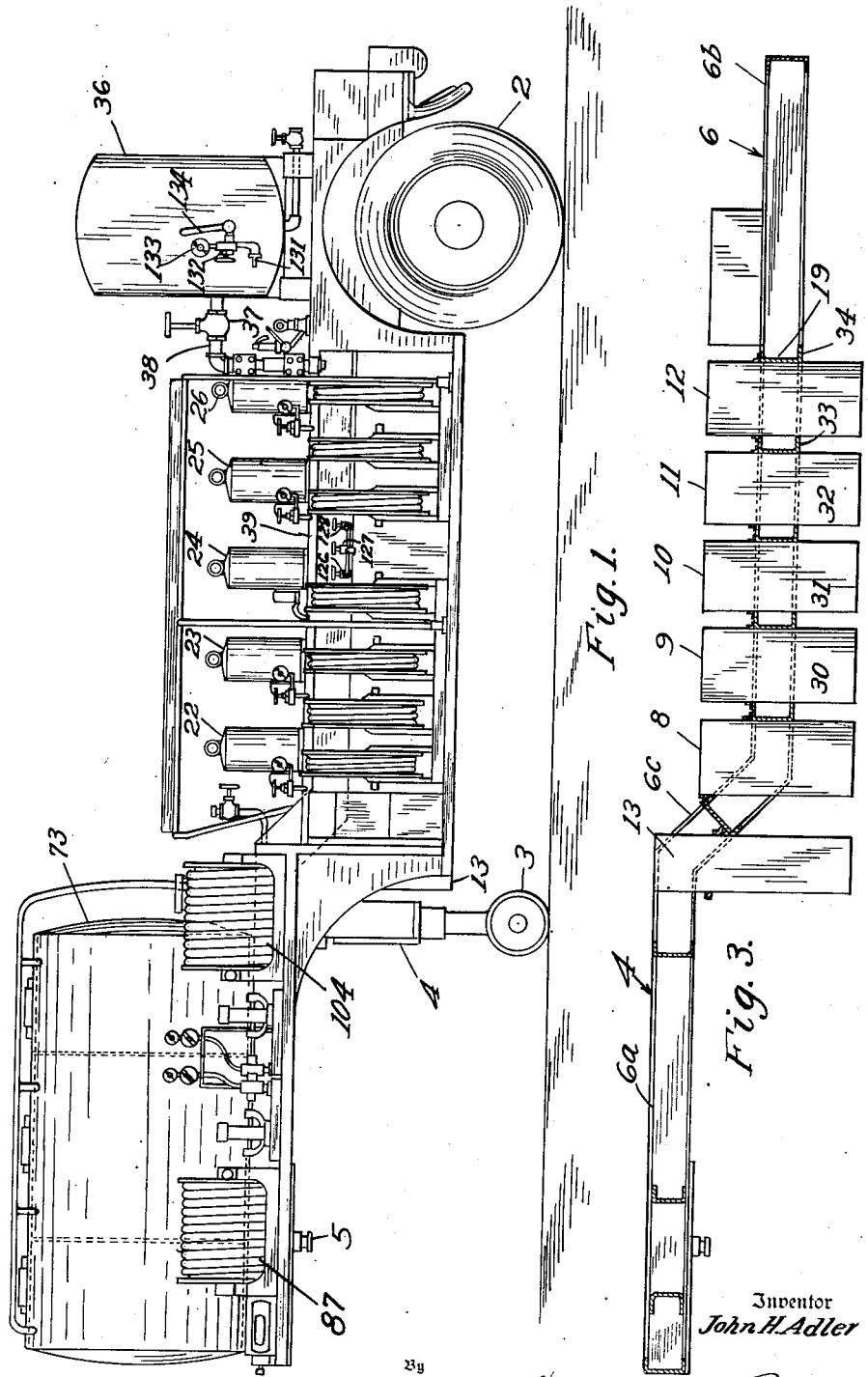

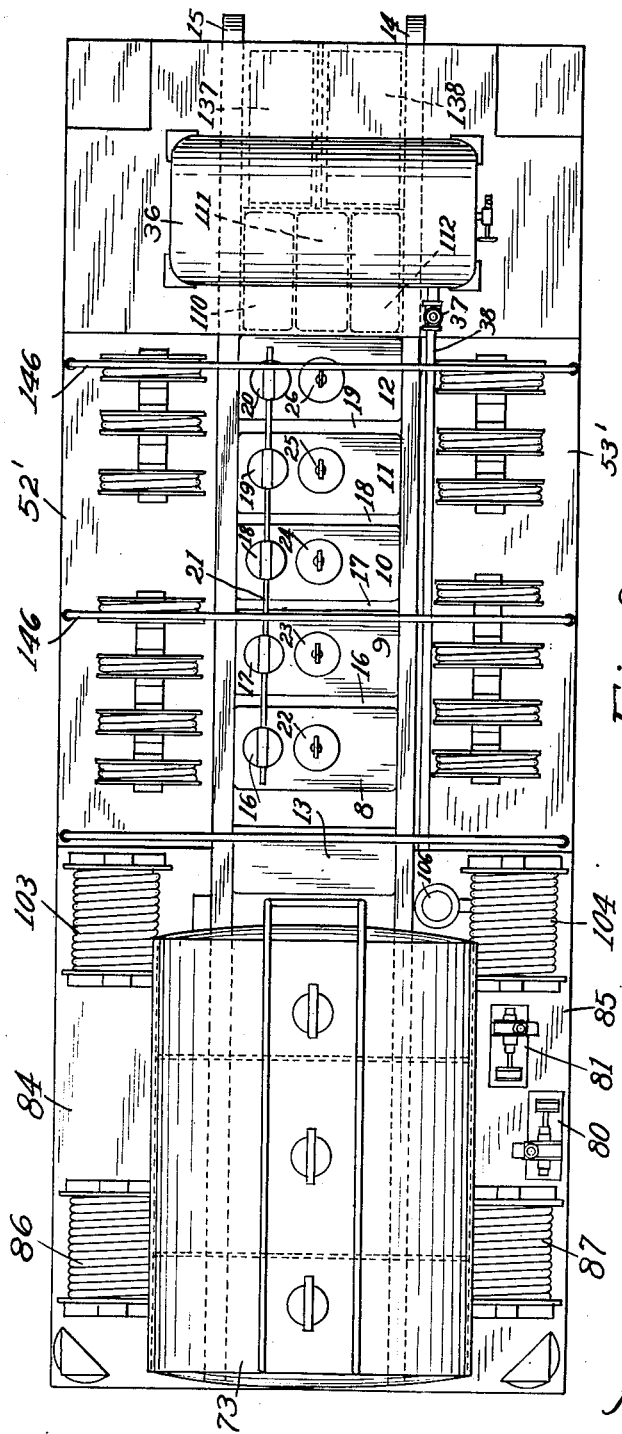

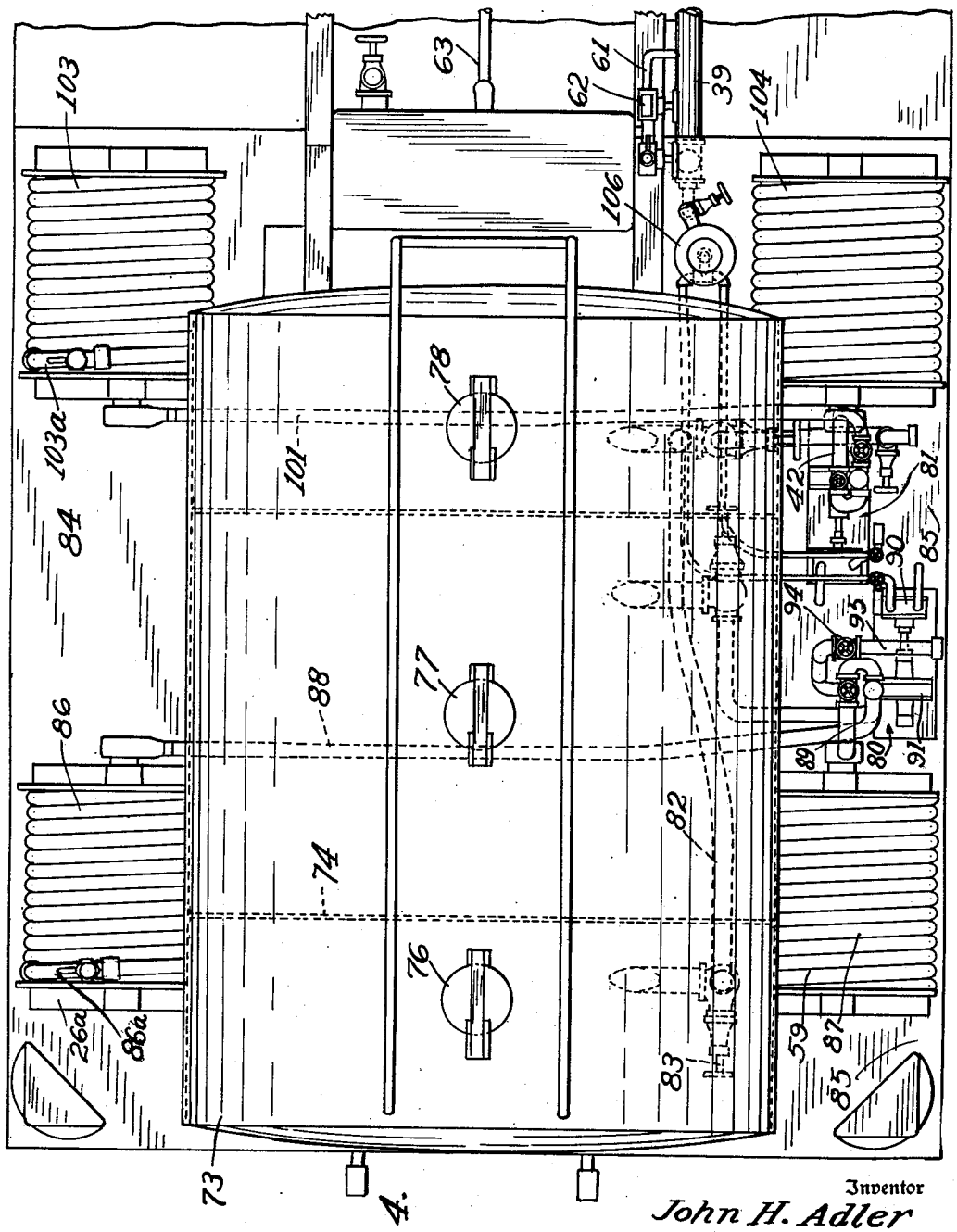

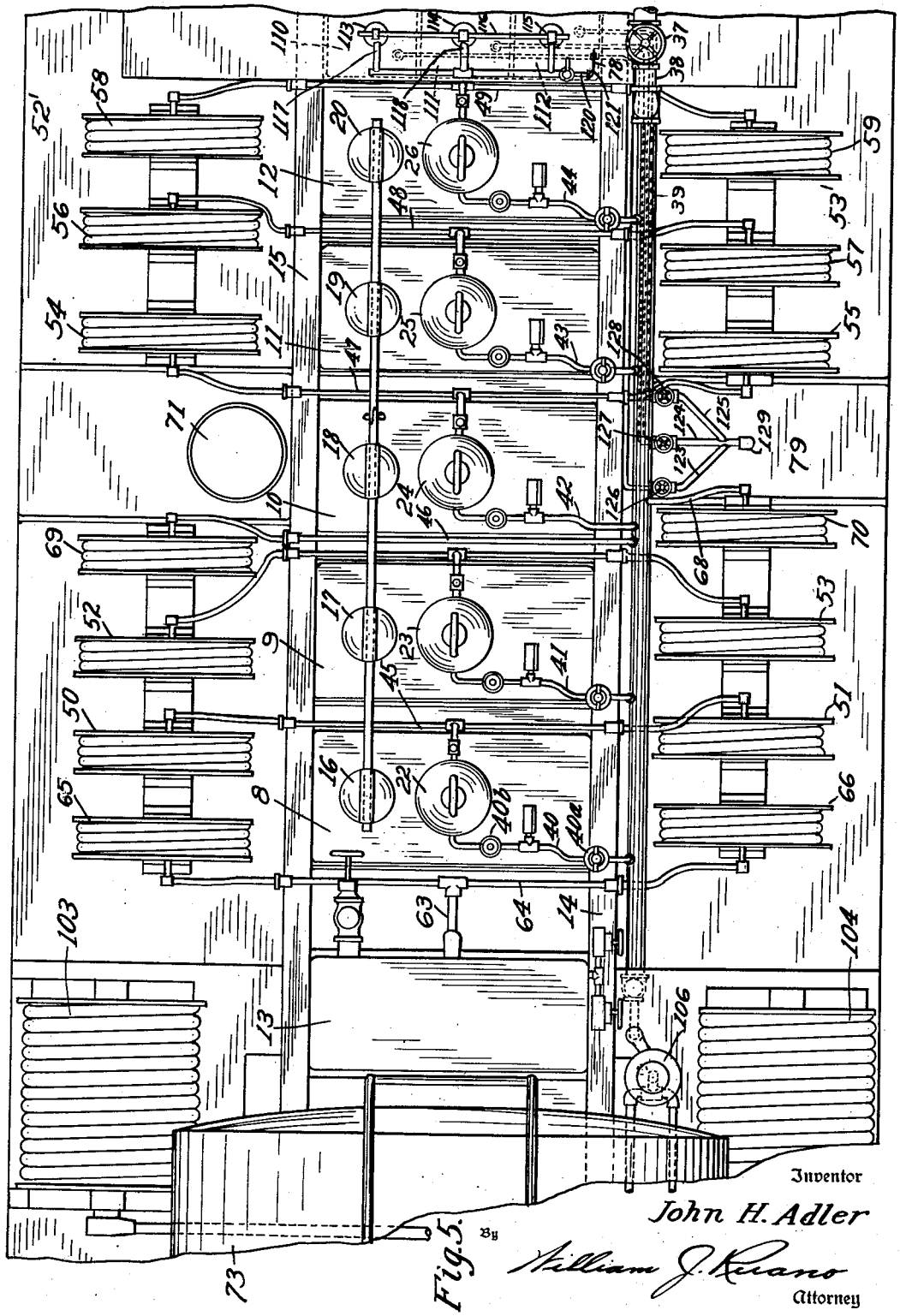

Inventor
John H. Adler
By
William J. Ruano
Attorney

Feb. 21, 1950  J. H. ADLER  2,498,229
PORTABLE SERVICE STATION MOUNTED ON A VEHICLE
Filed July 9, 1948  8 Sheets-Sheet 6

Inventor
John H. Adler
By
William J. Ruano
Attorney

Patented Feb. 21, 1950

2,498,229

UNITED STATES PATENT OFFICE 2,498,229

PORTABLE SERVICE STATION MOUNTED ON A VEHICLE

John H. Adler, Pittsburgh, Pa., assignor to Jax, Inc., Pittsburgh, Pa., a corporation of Pennsylvania Application July 9, 1948, Serial No. 37,738

10 Claims. (Cl. 222—128)

This invention relates to a portable service station mounted on a vehicle, or what may be termed a "service-station-on-wheels," for dispensing various products, such as lubricants (including greases and oils), fuels of the hydrocarbon family, coolants (including antifreeze) and air for tire inflation or for pneumatically operated tools and the like. The present application is a continuation-in-part of my copending application Serial No. 715,047, filed December 9, 1946, entitled "Portable service station," now abandoned.

A common way for providing service to vehicles in the field or at remote points from a permanent gas station is to load a plurality of drums of oil, gasoline, grease, etc., on a truck, each drum commonly having an air motor or pump unit connected to the top thereof, and to transport them to such remote points for dispensing their contents. An outstanding disadvantage of such procedure is that when these drums are emptied, it becomes necessary to unscrew the air motor fittings and to ship back the empty drums for refilling or replacement by filled drums of oil, gasoline, grease, or the like, thereby requiring substantial time and labor for the handling and transportation of the drums, as well as causing excessive wear of the air motor fittings as the result of frequent unscrewing and screwing thereof, causing loss of air pressure and products and ultimately requiring replacement of these fittings or air motor units.

Another disadvantage of such drums is that they are usually heavy and bulky, thereby occupy considerable space and add appreciably to the weight of the load carried by the truck. Furthermore, when carried on the truck platform, they are quite elevated from the ground, that is, their centers of gravity are rather high, thereby minimizing the mobility of the truck through rough fields due to the tendency of the drums to overturn or upset.

Another disadvantage in such use of drums is that, in practice, there is a tendency for the driver to await emptying of all or most of the drums before hauling them back to the supply station for refilling or replacement. As a result, there will be a number of empty drums on the truck at all times, which not only unnecessarily add to the weight, but take up valuable space and are unsightly.

Broadly stated, my invention comprises a vehicle, such as a trailer (or self-propelled vehicle), having permanent tanks and individually removable and replaceable tanks forming integral parts of the trailer chassis for storing service station products, such as oil, grease, water, compressed air, and the like, thereby lowering the center of gravity of the mass of such products and increasing the mobility of the vehicle through rough terrain. The invention also involves an optimum disposition of products-dispensing hose reels and other auxiliary parts necessary for providing efficient and flexible dispensing of various products and to enable quick servicing of several vehicles simultaneously while out in the field, as well as to enable easy and quick replacement or supply of the products as they are used.

An object of the present invention is to provide a novel portable service station which is devoid of the above-named disadvantages of drum carrying trucks commonly used in the art.

A more specific object of this invention is to provide a vehicle having permanently mounted tanks or receptacles thereon as integral parts of the chassis, together with auxiliary equipment necessary for an efficient and flexible dispensation of oil, gas, water, compressed air for tire inflation, and other service products normally provided by permanent service stations.

A still more specific object of this invention is to provide a mobile service station having a chassis reinforced or cross braced by a plurality of tanks, having low centers of gravity by suspending them on cross frame members extending at right angles to longitudinal frame members and serving as integral parts of the chassis, which tanks are readily detachable from said cross frame members for facilitating repair or replacement.

A still further object of this invention is to provide a mobile service station which is also useful as a power station, providing compressed air for operating pneumatically operated tools, such as impact wrenches, air hammers, spray guns, etc., and machinery and providing mechanical prime movers as well as electrical and hydraulic power sources for operating a wide variety of machinery and devices.

A further object of this invention is to provide a mobile service station having a multiple distribution system for dispensing oil, gasoline, water, etc., under pressure selectively from either side of the vehicle or from both sides simultaneously.

A still further object of the invention is to provide a mobile service station wherein the dispensing equipment and power source are disposed on a trailer in a novel manner and their loads distributed so as to greatly improve the riding qualities of the vehicle, providing a hammock-like suspension.

A still further object of this invention is to provide a portable service station on a drawn vehicle wherein permanent connections are provided for dispensing various products from tanks built into the vehicle and wherein the vehicle is self-contained, carrying its own power sources to make the vehicle self-sufficient and independent of the necessity of external sources of power for dispensing the products, and wherein the same power source (compressed air) used for dispensing the products is alternately used for refilling emptied or partly emptied tanks permanently mounted on the vehicle.

Other objects and advantages of the present invention will become apparent from a study of the following specification taken with the accompanying drawings wherein:

Fig. 1 is a side elevational view of a trailer embodying the principles of the present invention;

Fig. 2 is a top or plan view of the trailer shown in Fig. 1;

Fig. 3 is a longitudinal cross-sectional view of the chassis of the trailer shown in Figs. 1 and 2;

Fig. 4 is an enlarged top or plan view of the front portion of the trailer shown in Figs. 1 and 2 and showing fuel dispensing equipment;

Fig. 5 is an enlarged top or plan view of the central portion of the trailer shown in Figs. 1 and 2 and showing grease and oil dispensing equipment;

Figure 6:
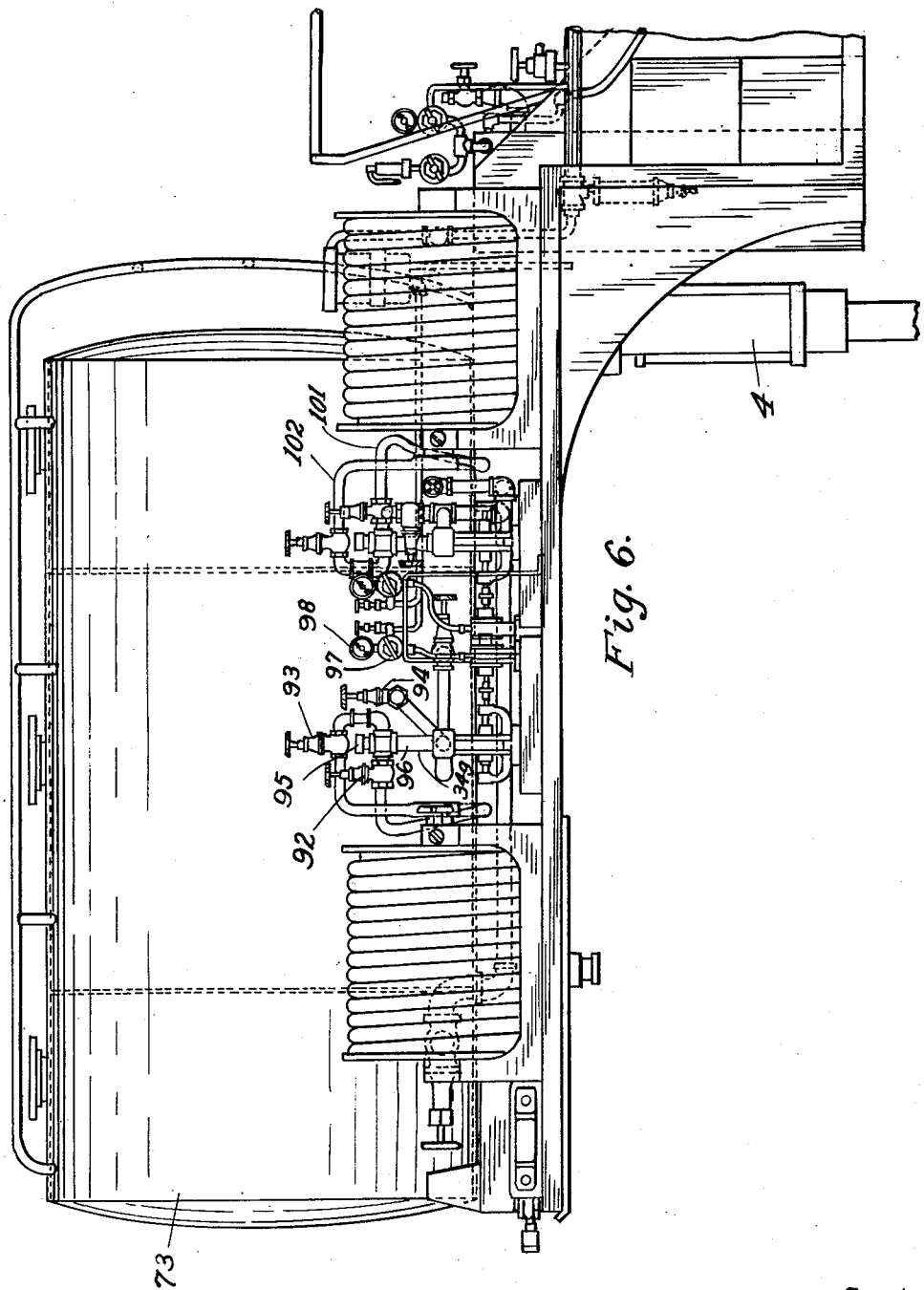
Fig. 6 is an enlarged side view of the structure shown in Fig. 4.

Referring more particularly to Figs. 1 and 2 of the drawings, there is shown a trailer comprising a pair of rear wheels 2 and a pair of front wheels 3. The front wheels are vertically retractable in a telescopically fitting frame member 4 in a well known manner to permit raising of the front wheels 3 when the trailer is being pulled or hauled by means of a truck or tractor which is attached to the trailer by means of a hitch connected to hitching post 5.

An outstanding feature of the present invention resides in lowering of the center of gravity of as much of the load carried by the trailer as possible, that is, both the permanent frame parts of the trailer as well as the permanent liquid carrying tanks. As will be more apparent from an inspection of Fig. 3, the frame or chassis denoted generally by numeral 6 has a front portion 6a and a rear portion 6b interconnected by a gooseneck or inclined frame portion 6c whereby the rear portion is located at an elevation substantially below that of the front portion so as to lower the centers of gravity of a plurality of tanks 8, 9, 10, 11 and 12 suspended on the rear portion. These tanks may store oil, grease or other lubricants. A tank 13, preferably for storing water, is mounted at the top of the gooseneck portion 6c. The tanks extend crosswise between two longitudinally running channels or channel-shaped frame members 14 and 15 of the chassis structure, as shown more clearly in Fig. 2. The tanks 8 to 12, inclusive, have covers 16 to 20, inclusive, respectively, which may be interlocked by means of a locking rod 21 extending through registering apertures formed in the respective covers. Each of the tanks has mounted thereon an air pump for pneumatically pumping out liquid contained in the tank to levels higher than the tank or at pressures greater than that obtained by gravity flow. Such air motors or pumps for tanks 8 to 13, inclusive, are denoted by numerals 22 to 26, inclusive, respectively, and are of a construction well known in the art, having an air motor pump unit located at the top thereof and a long tubular part immersed in the liquid contained in the tank through which liquid is drawn or pumped.

Each of the individual tanks 8 to 13, inclusive, is suspended crosswise of the longitudinally running frame members 14 and 15 by means of a pair of angle-shaped suspending strips, such as 27 and 28, welded on opposite sides of tank 9, for example. These suspending strips are supported on the top flanges of cross braces or frames 30 to 34, inclusive. For instance, tank 9 is supported on cross braces 30 and 31. The ends of the cross braces are welded or brazed inside of opposing web portions of frame members 14 and 15. By suspending the tanks in this manner, they can be individually removed and replaced very quickly either for repair purposes or replacement. Oftentimes, a single tank may develop a leak, in which case it is a simple matter to quickly remove the individual tank without disturbing the remainder of the tanks. It will be noted that a substantial portion of the respective tanks 8 to 13, inclusive, extend below the supporting framework, thereby considerably lowering the center of gravity of the tanks and their contents. Even the gooseneck portion 6c of the chassis has supporting strips for supporting one side of tank 8 and one side of tank 13. Since the tanks 8 to 13, inclusive, are rigidly secured to and extend clear across the longitudinally extending frame members 14 and 15, they themselves serve as cross braces for aiding the conventional cross braces 30 to 34, inclusive, in cross bracing the frame structure or chassis, thereby providing a relatively stiff, laterally reinforced chassis structure. Thus the amount of normal cross bracing required by the braces 30 to 34, inclusive, is substantially reduced, thereby minimizing the cost as well as weight of the complete chassis. Since the suspended tanks 8 to 13, inclusive, are located centrally of the trailer, the riding qualities of the trailer are considerably improved, particularly in view of the substantial lowering of the centers of gravity of the tanks as compared to ordinary tanks which are normally supported on top of truck or trailer platforms.

Figure 7:
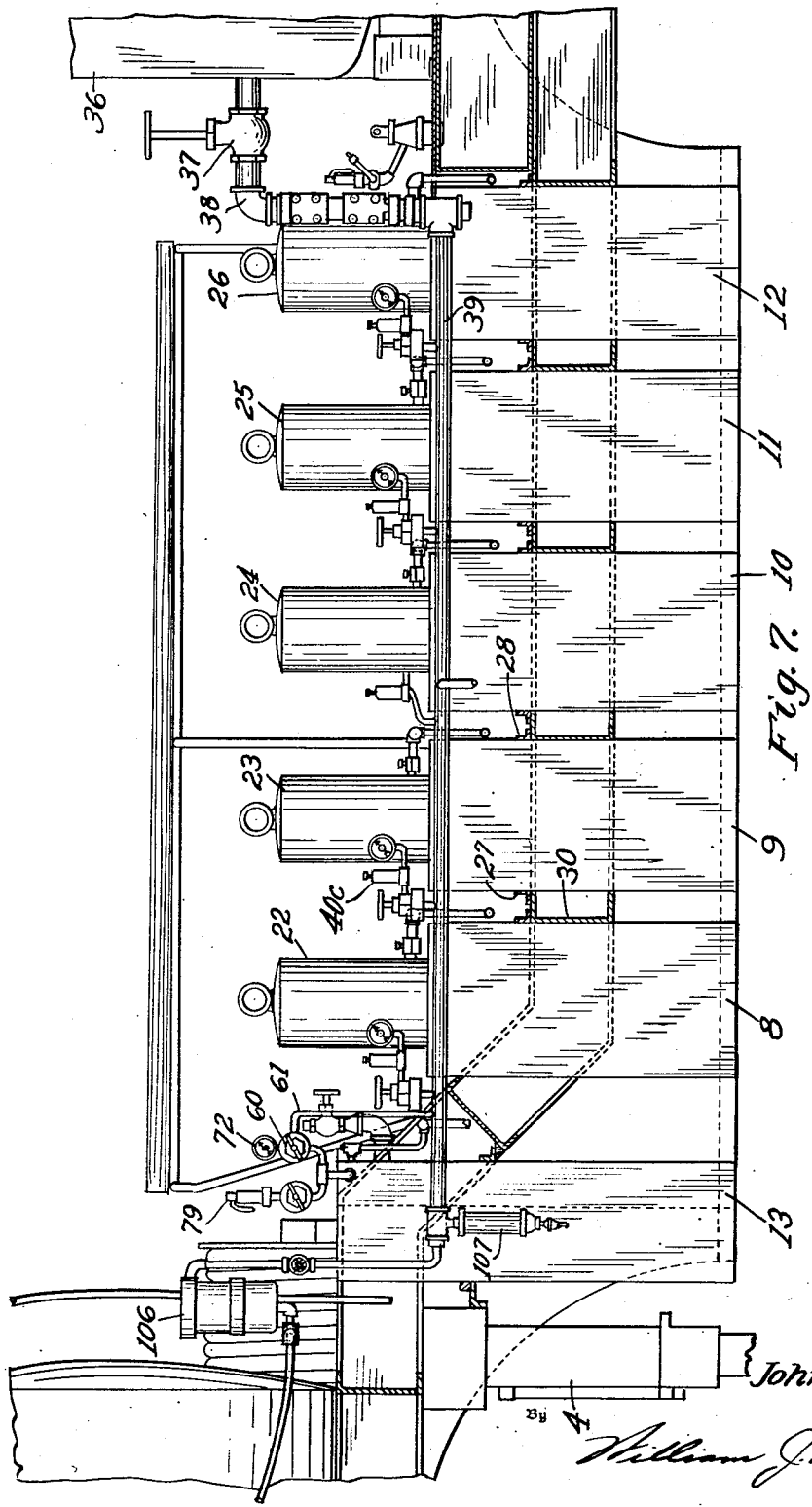
Fig. 7 is an enlarged side view partly in cross-section, of the structure shown in Fig. 5.

In order to supply air pressure to the various air pumps 22 to 26, inclusive, a compressor tank unit is provided within a housing 36, which unit includes a compressor tank and a gasoline driven motor therefor of any well known construction. Air under pressure is supplied through shut off valve 37 and pipe 38 to a longitudinally extending air supply manifold 39 which is connected by means of branch pipes 40 to 44, inclusive, to the respective air pumps in the air pump units 22 to 26, inclusive, respectively (see Fig. 5). Each of the branch pipes has a pressure regulating valve, such as 40a, and a pressure gauge, such as 40b, connected to branch pipe 40. Thus the air pressures to the various air pumps may be regulated and visually observed. Oil lubricators, such as 40c, are also provided (see Fig. 7). Liquid lubricant, under pressure, is pumped out of the respective air pumps 22 to 26, inclusive, through T connections connected to outlet branch pipes 45 to 49, inclusive. Pipe 46 feeds a pair of reels 52 and 53; pipe 47 feeds a pair of reels 54 and 55; pipe 48 feeds a pair of reels 56 and 57, and pipe 49 feeds a pair of reels 58 and 59.

Platforms 52' and 53' upon which the various reels are supported provide a hammock-like support, and have a slight lateral swing simulating a hammock and enhancing the riding qualities of the trailer.

Air under pressure is also fed to water tank 13 through branch pipe 61 (see Fig. 4) and shut off valve 62. The air pressure is regulated by pressure regulating valve 60 and is indicated by pressure gauge 72. A safety valve 79 is also provided. Water under pressure flows outwardly of the tank through pipe 63 which, through a T connection, feeds pipe 64 and the pair of water dispensing reels 65 and 66.

Air under pressure is also fed from manifold 39 through branch pipes 67 and 68 to a pair of tire inflating reels 69 and 70, respectively.

A fire extinguisher 71 may be conveniently placed between groups of reels on platform 52.

Thus, as described hereinabove, for each type of oil or grease, there are duplicate outlets through reels located on opposite sides of the trailer. Likewise, there are duplicate hose reels for dispensing water as well as for dispensing air along opposite longitudinal sides of the trailer. This enables simultaneous servicing of two cars or trucks located on opposite sides of the trailer or the selective servicing of either of them. Similarly, other liquids or fluids may be simultaneously dispensed on opposite longitudinal sides of the trailer so as to service vehicles in half the normal time required.

At the front of the trailer there is supported a large fuel tank 73, preferably compartmented by partitions 74 and 75, for storing gasoline, Diesel fuel, or other liquid fuel, or liquids, particularly those of the hydrocarbon family. The respective compartments have at the top thereof cover plates 76, 77 and 78 for covering inlets through which liquid fuel may be introduced for supplying the tank 73. Two separate pump means are provided for supplying liquid fuel to the compartments in tank 73, one for the central compartment and one for the interconnected outer compartments. Pipe 82 interconnects the outer compartments through a shut off valve 83 (see Fig. 4). By closing the valve, different fuels may be supplied to the outside compartments. By opening it, the liquid level of the same fuel in the outside compartments will be maintained the same, thereby equally distributing the load. These two separate pump means are connected to the compressor tank unit and are in the form of Xmas tree connections and pump units 80 and 81 which will be described in detail hereinafter. Supported on opposite platforms 84 and 85 in the front portion of the trailer are a pair of hose reels 86 and 87 connected to pump unit 80 through pipes 88 and 89, respectively, and each provided with a suitable dispensing nozzle, such as 86a. Each of the Xmas tree pump units, such as 80, comprises an air motor 90 and a fuel pump 91 driven thereby, which pump serves the purpose of pumping liquid fuel to the respective dispensing hose reels 86 and 87. The supply of fuel to the hose reels 86 or 87 through pipes 88 and 89 may be cut off by means of cut-off valves 92 and 93, respectively (see Fig. 6). An additional cut-off valve 94 is provided for the purpose of pumping fuel into tank 73 for refueling the tank when necessary. Such refueling is accomplished by connecting a hose to the valve 94, which hose may be immersed in a fuel supply barrel or tank and by connecting another hose to the pipe connection 95 after the plug on such connection is removed and leading the latter hose through one of the inlets normally closed by cover plates 76, 77 and 78. Valves 92 and 93 are closed during this time and valve 94 is open so that the pump will pump fluid from the external source, through the vertically extending pipe 96 to the hose connected to the pipe connection 95, thence through a hose to the top of the tank 73. The air supply pipe to each air motor includes a pressure regulating valve, such as 97, so as to enable varying of the pressure supply to the air motor, and a pressure gauge, such as 98, for indicating the pressure.

A suitable identical Christmas tree pump unit 81 is provided for pumping liquid fuel from the outer interconnected compartments through pipes 101 and 102 to dispensing reels 103 and 104, respectively. Dispensing nozzles, such as 103a, are provided on these reels. Pump unit 81, similar to pump unit 80, may, by selective control of the associated valves, selectively pump fuel from the outer compartments to hose reels 103 and 104, or from an external source of supply to the outer compartments by applying suitable hose connections, similar to those for pump unit 80.

Since the outer compartments of the tank 73 are smaller in capacity than the central compartment, a convenient arrangement is to store Diesel fuel in the outer compartments and gasoline in the central compartment. However, these may be interchanged if so desired. Other liquids, such as fire extinguishing liquid, may be stored.

A moisture filter 106 is connected between the air supply manifold 39 and the air supply lines leading to the respective air motors of pump units 80 and 81 for the purpose of draining out moisture and water that is contained in the line and that might otherwise be injurious to the operation of the air motors. Such filter may be of any well known construction. Thus the air going to the respective rotary motors in the two Xmas tree connections is free of moisture and thereby will insure optimum performance of these motors. A drain connection 107 is provided to drain water which may collect in the air supply manifold as well as that discharged from the moisture filter 106.

At the rear of the trailer there are disposed a plurality of compartments 110, 111 and 112 which are supported between longitudinal frames 14 and 15 and are integrally formed as part of the chassis. These compartments may be used for storing oils or greases and have caps 113, 114 and 115 which may be locked together by a rod 116. The various tanks are connected by means of branch pipes 117, 118 and 119 to a common air supply pipe 120 having a valve connection 121 similar to that on a tire inflating hose and which may be pressured by means of an external air source. More specifically, air from the tire inflating reels 69 or 70 may be applied to valve 121 so as to place the liquid under pressure in tanks 110, 111 and 112, which liquid is dispensed through dispensing pipes 123, 124 and 125, respectively, controlled by shut off valves 126, 127 and 128, respectively. The liquid is dispensed through a common outlet or faucet 129. These tanks, therefore, act as additional supply units in which liquids are dispensed by gravity. If the trailer is inclined, an external source of air may be applied to valve 121 to assist in dispensing the products.

Extending from the air compressor unit 36 (see Fig. 1) is a hose coupling 131, a regulating valve 132, a pressure indicator 133, and a shut off valve 134. Thus air under pressure may be supplied to any external device, particularly pneumatic tools, such as impact wrenches, air hammers, or in fact, any pneumatically operated tool or machine, the pressures of which may be regulated by the valve 132. Thus the trailer assembly is extremely useful on farms and other remotely situated places as a source of pneumatic power.

Figure 8:
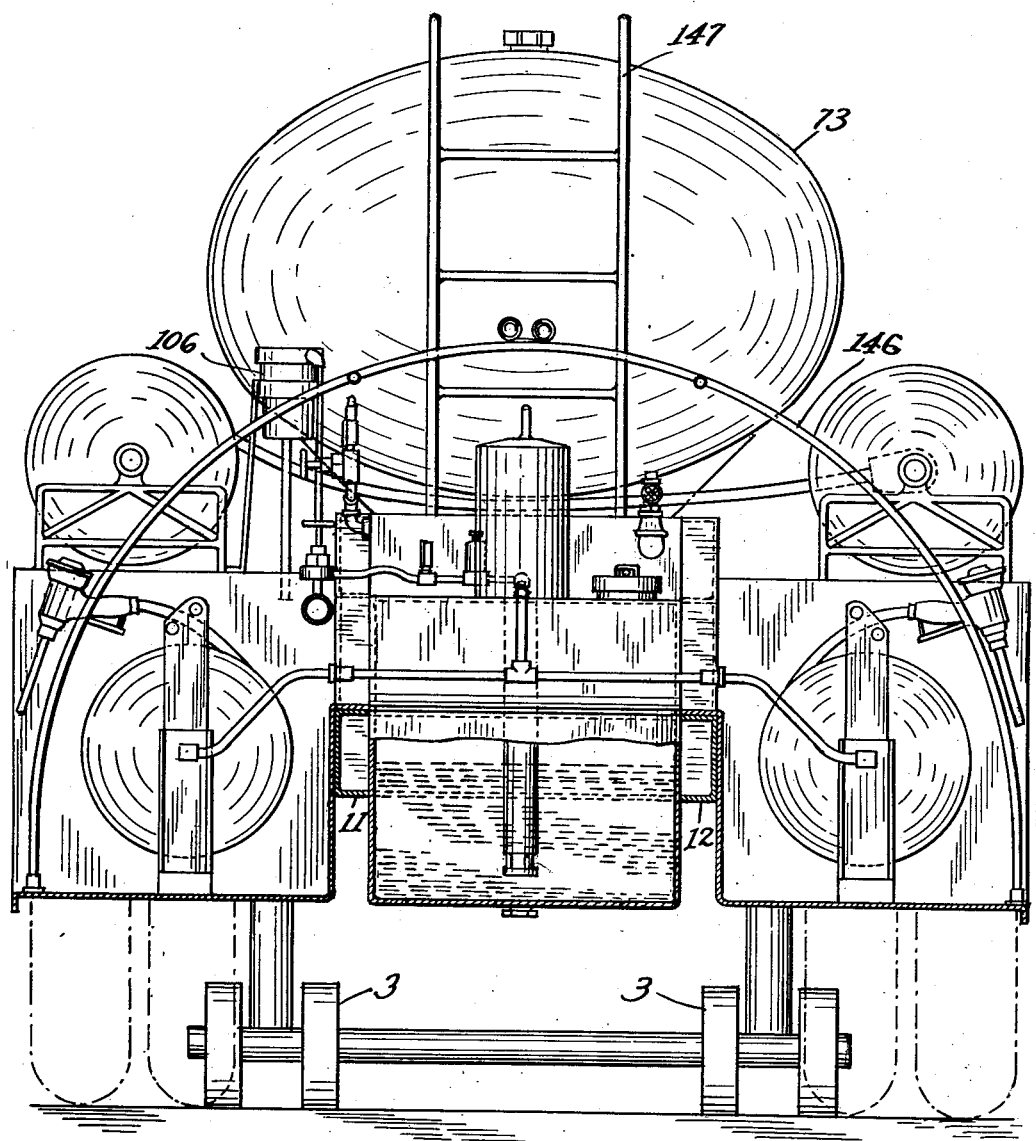
Fig. 8 is an enlarged transverse cross-sectional view of the trailer looking towards the rear.
Figure 9:
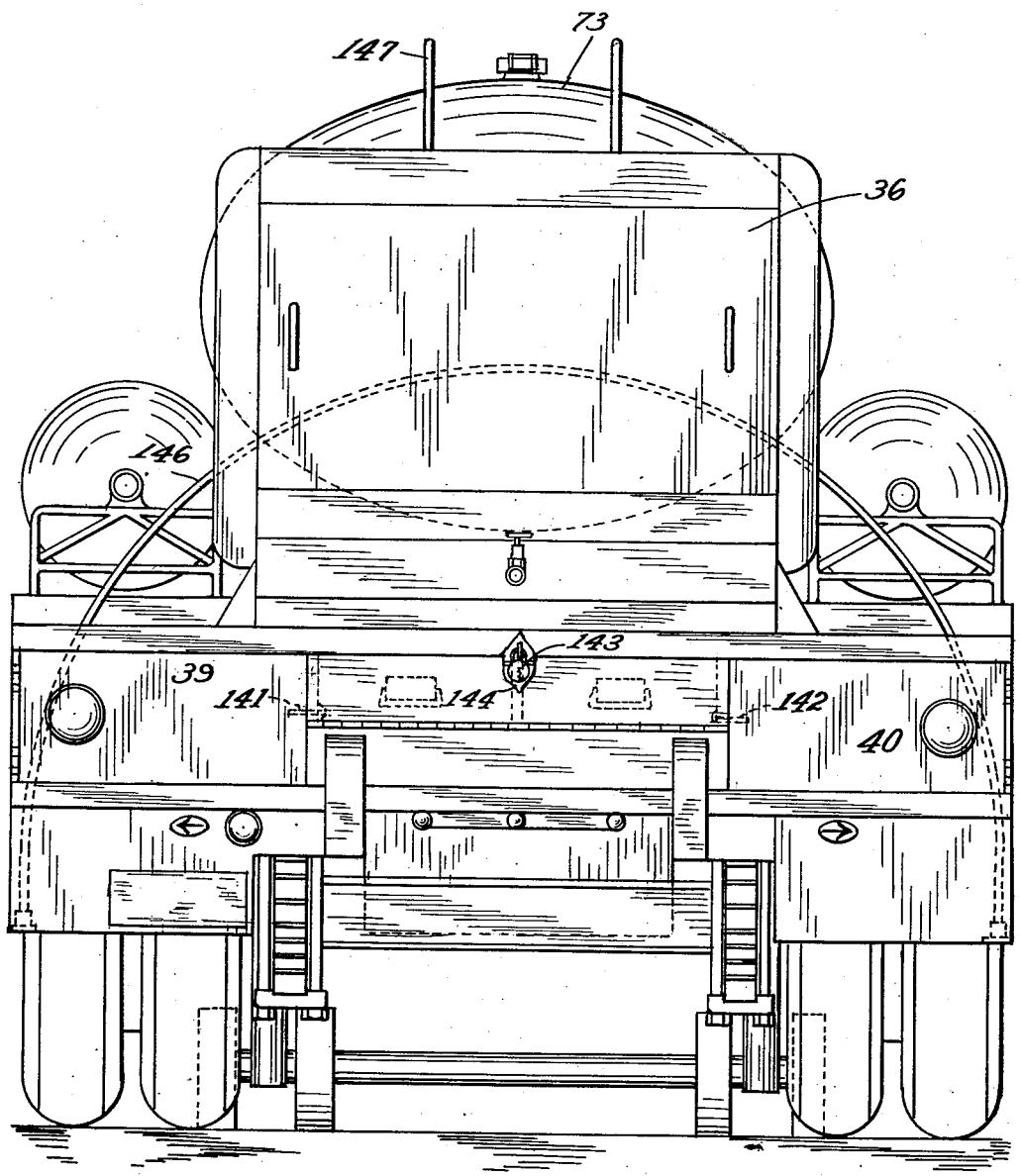
Fig. 9 is a rear view of the trailer.

At the rear of the trailer, as shown more clearly in Figs. 2, 8 and 9, there are disposed rearmost tanks or compartments 137 and 138 extending between longitudinal frames 14 and 15 for storing tools or accessories. In addition, the remaining spaces or compartments 139 and 140 at the extreme rear may be used for tools, gloves and other accessories. More specifically, doors for compartments 139 and 140 are pivotally mounted along their lower edges to the back of the trailer and may be held in an erect position by pins 141 and 142, respectively. After the pins are inserted into holes formed along the inner side edges of the respective doors, the door of a central compartment 143 pivotally mounted along the bottom edge is swung into a vertical position and may be locked into such position by a padlock 144. When the door is so locked, it will conceal pins 141 and 142, which pins serve to lock the outside doors, hence there will be no necessity for locking such doors. In other words, the single lock 143 serves to lock all three pivoted doors.

At the top of the trailer there is disposed a somewhat parabolic-shaped framework 146 used for supporting a canvas protective cover for covering the entire trailer or a substantial portion thereof to protect it from rain, snow and, to some extent, cold weather. A ladder 147 is provided for mounting the tank 73 such as during refueling of such tank.

Thus it will be seen that I have provided a very efficient and extremely useful trailer assembly which serves as a portable service station for servicing vehicles in the field, such as vehicles engaged in construction work, army vehicles, farm vehicles and the like; furthermore, such service station is unique in that it has identical dispensing reels disposed on opposite sides thereof to enable simultaneous servicing of two vehicles located along each side of the trailer. Furthermore, in addition to service station equipment and liquids, such as gasoline, Diesel fuel, oil, grease, antifreeze, and the like, the trailer has mounted thereon a source of pneumatic power in the form of a compressor unit for supplying air under pressure to pneumatically operated tools and machinery. Moreover, the compartments of the trailer are permanently built into the trailer and many of them are individually replaceable so as to provide a permanent frame construction in which the compartments are so disposed as to considerably improve the riding qualities of the vehicle, their centers of gravity being extremely low and the compartments being centrally located along the entire length of the trailer, making it readily portable and giving it excellent riding qualities, even over the roughest terrain and around curves at relatively high speed.

While the above construction has been described in connection with a trailer unit, it should be noted that, if desired, a self-powered truck can be used instead, in which case the front portion of the trailer would have added thereto the normal front portion of a truck, which while probably lengthening the structure, makes it a self-contained unit useful for many purposes. Furthermore, the hose reels which are mounted on opposite platforms or running boards of the central part of the trailer unit are disposed somewhat in the form of a hammock and have riding qualities which simulate somewhat that of a hammock in that there is a somewhat lateral swinging movement of the central part of the trailer assembly which gives great comfort in riding.

While I have illustrated and described a certain embodiment of my invention, it will be understood that this is by way of illustration only, and that various changes and modifications may be made within the contemplation of my invention and within the scope of the following claims.

I claim:

1. A trailer chassis comprising a pair of longitudinally extending frames, the front end portions of which are at a higher level than the rear end portions, there being a gooseneck-like integral connection between said portions, a plurality of cross braces integrally connected with and extending in spaced parallel relation crosswise of said frames, and a plurality of tanks extending transversely of said frames and directly supported by said cross braces so as to become a part of the cross framing, each of said tanks having supporting means integrally extending from the upper portions of the side walls thereof intermediate their height and directly supported by the flanges of said cross braces, therefore being readily detachable and replaceable and whereby a substantial portion of the height of said tanks depends below said cross braces.

2. A trailer comprising a chassis having two longitudinally extending frames of channel-shaped cross-section, the flanges of which extend toward each other in confronting relationship, a substantial length of the rear portions of said frames being disposed at a height substantially below that of the front portions so as to lower the centers of gravity thereof, a plurality of laterally extending cross frames connected to said rear portions and disposed in spaced parallel relationship and the ends of which are integrally secured to the web portions of said longitudinally extending frames, and a plurality of tanks having ribs welded to the upper portions of opposite longitudinal sides thereof intermediate their height directly supported by the top flanges of said cross frames for individually supporting in a readily detachable manner each of said tanks so as to form part of the chassis, and whereby a substantial portion of the height of said tanks depends below said cross frames, thereby increasing the mobility of the trailer.

3. A trailer comprising a pair of rear wheels, a pair of front wheels which are vertically adjustable, a hitch connection at the front for attachment to a truck for the purpose of drawing the trailer, a pair of longitudinally extending frames forming the longer portions of the trailer chassis and having gooseneck-like front portions integrally extending at a level higher than said longer portions, said frames being of channel-shaped cross-section and having confronting flange portions, a plurality of cross braces extending between said frames in spaced parallel relationship, a plurality of rectangularly-shaped tanks having supporting strips welded on opposite sides thereof intermediate their height for support by the top flanges of said cross braces, thereby making the tanks individually detachable and replaceable and whereby the tanks themselves extend below said frames and form an integral part of the cross bracing structure of the chassis to impart substantial rigidity transversely of said frames, and an additional tank detachably mounted on the gooseneck portion of said longitudinally extending frames, a substantial length of said tank extending below the point of support.

4. In a trailer tank vehicle for dispensing gasoline service station products, a chassis including a pair of longitudinally extending frame members, a plurality of separate tanks extending across and depending between said frame members, each of said tanks having mounted thereon a pump unit operated by an air motor, a source of compressed air mounted on said vehicle, an air supply manifold extending longitudinally of said chassis and connecting said source to said respective air motors for applying motive power to operate said pump units without exposure of the liquid in the tanks to said compressed air, a plurality of hose reels mounted on said vehicle, each connected to the outlet of one of said pump units and having a dispensing spigot at the end thereof, whereby any of the various liquids in said tanks may be selectively dispensed.

5. A vehicular trailer for dispensing service station liquids, including a chassis, a plurality of separate, permanent tanks rigidly and detachably mounted on said chassis and extending transversely thereof, each of said tanks having mounted thereon a pump unit including an air motor for motivating the respective pump unit, a source of compressed air mounted on said trailer, an air supply manifold extending longitudinally of said chassis and connecting said source with said respective air motors without exposure of the liquid in the tanks to said compressed air, longitudinally extending platforms along each side of said chassis and simulating mudguards, a plurality of pairs of hose reels supported on said platforms, a hose reel of each pair being mounted on opposite platforms, and valve means for selectively dispensing liquid under pressure from either or both of any of said pairs of hose reels, whereby two vehicles on opposite sides of the trailer may be simultaneously serviced.

6. In a trailer tank vehicle for dispensing gasoline service station products, a chassis including a pair of longitudinally extending frame members, spaced parallel cross frame members connected between said longitudinally extending frame members, a plurality of separate rectangular tanks having supporting elements extending from opposite walls thereof, said supporting elements being directly and detachably supported on said cross frame members so that said tanks will depend therefrom and thereby lower their centers of gravity, each of said tanks having mounted thereon a pump unit operated by an air motor, a source of compressed air mounted on said vehicle, an air supply manifold extending longitudinally of said chassis and connecting said source to said respective air motors for applying motive power to operate said pump units without exposure of the liquid in the tanks to said compressed air, a plurality of hose reels mounted on said vehicle, each connected to the outlet of one of said pump units and having a dispensing spigot at the end thereof, whereby any of the various liquids in said tanks may be selectively dispensed.

7. A service station liquid dispensing trailer having a front, central, and rear portion, a compressor unit carried on said rear portion, a plurality of tanks mounted on said central portion, an air motor pump unit supported on top of each of said tanks, the air motors of which are supplied by air under pressure from said compressor unit, an air intake manifold connected to said compressor unit and extending longitudinally of said central portion of the trailer, a plurality of branch pipes connected to said manifold, each having a pressure regulating valve for supplying air under regulated pressure from said compressor unit to said motors, and a plurality of pairs of reels on opposite sides of said central portion of the trailer, supported at a height substantially that of the trailer axle, each pair of reels being connected to a single one of said tanks and being supported on opposite sides of said trailer, and means for selectively dispensing liquid under pressure from either or both of the reels of a corresponding pair of reels, whereby two vehicles located on opposite sides of said trailer may be simultaneously serviced.

8. A trailer tank vehicle having a low center of gravity, comprising a chassis having a pair of longitudinally extending frames with integrally formed goosenecks for raising the front portions of said frames to a level higher than that of the rear portions, a liquid storing tank mounted on said front portion, a plurality of separate tanks mounted transversely of said rear portion in a manner so as to depend between said frames and thereby lower their centers of gravity, a plurality of pairs of hose reels mounted on opposite sides of said trailer, a gasoline engine driven compressor mounted on the extreme end of said rear portion, and an air motor pump unit mounted on each of said tanks, each motivated by an air motor for supplying liquid under pressure to said hose reels, the hose reels of said respective pairs being located on opposite sides of said vehicle for selectively dispensing liquid under pressure from said respective tanks from either or both sides of said vehicle.

9. A portable service station comprising a vehicle having longitudinally extending, parallel disposed frames, a plurality of cross frames extending thereacross in spaced parallel relationship, a plurality of rectangular containers for storing different types of service fluids including lubricating oil and grease, each container having supporting strips integrally extending from opposite side walls thereof and supported by the top flanges of a pair of adjoining cross frames so as to provide a readily detachable support for each individual tank and so as to support the tank in a manner so that a substantial portion of its height depends below said longitudinally extending frames to considerably lower their centers of gravity and thereby increase the mobility of said vehicle, each of said containers having an air motor pump unit mounted on the top thereof, a compressed air tank, an air intake manifold connected to said compressed air tank and extending longitudinally of said vehicle, a plurality of supply pipes, each including a pressure regulating valve for supplying regulated air pressure from said manifold to the air motors of said respective pump units, a plurality of pairs of hose reels having outlet spigots, a reel of each pair being disposed on opposite sides of said vehicle, the outlet of each of said air pumps being connected to a pair of hose reels to enable selective dispensing of the same type of service liquid from the same tank from either or both sides of the vehicle simultaneously to permit simultaneous servicing of two other vehicles located at opposite sides of the service station vehicle.

10. A trailer tank vehicle having mounted thereon a liquid fuel storage tank, a pair of hose reels with dispensing spigots at the ends thereof, said reels being mounted on opposite sides of said vehicle, a source of air under pressure also mounted on said vehicle, an air motor connected to said source, an air pump mechanically coupled to said motor, thereby preventing exposure of the liquid fuel to air from said source, a plurality of supply pipes connecting said tank to said reels and to which said pump is connected so as to force liquid under pressure from said tank to said reels, said supply pipes including pressure regulating valves, shut-off valves for disconnecting said tank from said pump, and a separate outlet and inlet connected to said pipe whereby a flexible hose may be connected from an external source of supply to said inlet while said outlet may be connected by a second flexible hose to said fuel storage tank in a manner so that said pump will pump liquid from said external source of supply into said tank while the connections to said respective reels from said tank are closed.

JOHN H. ADLER.

REFERENCES CITED

The following references are of record in the file of this patent:

UNITED STATES PATENTS

| Number | Name | Date |
| --- | --- | --- |
| 330,853 | Rosenfield | Nov. 17, 1885 |
| 453,358 | Maxon | June 2, 1891 |
| 889,575 | Bowser | June 2, 1908 |
| 1,311,981 | Lucius | Aug. 5, 1919 |
| 1,497,575 | Menge | June 10, 1924 |
| 1,705,649 | Scott | Mar. 19, 1929 |
| 1,778,987 | Cunningham | Jan. 13, 1931 |
| 1,892,519 | Schottgen | Dec. 27, 1932 |
| 1,897,164 | Endacott | Feb. 14, 1933 |
| 2,053,840 | Norquist et al. | Sept. 8, 1936 |
| 2,105,302 | Thwaits | Jan. 11, 1938 |
| 2,169,500 | Reid | Aug. 15, 1939 |
| 2,285,543 | Thomas | June 9, 1942 |
| 2,315,085 | Churchward | Mar. 30, 1943 |
| 2,325,355 | Yost | July 27, 1943 |
| 2,421,765 | Taylor | June 10, 1947 |

FOREIGN PATENTS

| Number | Country | Date |
| --- | --- | --- |
| 35,111 | Austria | Nov. 10, 1908 |